United States Patent
MacGarry et al.

(10) Patent No.: US 10,691,511 B2
(45) Date of Patent: Jun. 23, 2020

(54) COUNTING EVENTS FROM MULTIPLE SOURCES

(71) Applicant: Arm Limited, Cambridge (GB)

(72) Inventors: Fergus Wilson MacGarry, Cambridge (GB); Alex James Waugh, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/135,335

(22) Filed: Sep. 19, 2018

(65) Prior Publication Data

US 2020/0089549 A1 Mar. 19, 2020

(51) Int. Cl.
*G06F 9/54* (2006.01)
*G06F 11/34* (2006.01)

(52) U.S. Cl.
CPC .......... *G06F 9/542* (2013.01); *G06F 11/3409* (2013.01); *G06F 2201/86* (2013.01); *G06F 2201/88* (2013.01)

(58) Field of Classification Search
None
See application file for complete search history.

(56) References Cited

U.S. PATENT DOCUMENTS

| 4,849,924 A * | 7/1989 | Providenza | G06F 11/348 708/672 |
| 2003/0037089 A1* | 2/2003 | Cota-Robles | G06F 9/4881 718/1 |
| 2004/0064290 A1* | 4/2004 | Cabral | G06F 11/348 702/182 |

* cited by examiner

*Primary Examiner* — Craig C Dorais
(74) *Attorney, Agent, or Firm* — Nixon & Vanderhye P.C.

(57) ABSTRACT

A first event source generates a first indication of a first event which has occurred in the first event source, the first indication being one of a predefined set of indications corresponding to a plurality of event types. A second event source generates a second indication of a second event which has occurred in the second event source, the second indication being one of the predefined set of indications corresponding to the plurality of event types. First event selection circuitry responds to the first indication matching a selected event type of the plurality of event types to generate a first count signal and second event selection circuitry responds to the second indication matching the selected event type of the plurality of event types to generate a second count signal. Count circuitry increments a counter in response to either the first count signal or the second count signal.

13 Claims, 6 Drawing Sheets

COUNTING EVENTS FROM MULTIPLE SOURCES

TECHNICAL FIELD

The present disclosure relates to data processing. More particularly, it relates to counting the occurrence of events taking place in multiple event sources in a data processing apparatus.

DESCRIPTION

A data processing apparatus may be arranged to provide a user with indications of certain events which occur within the data processing apparatus, for example by means of a counter which increments when a particular event takes place.

SUMMARY

In one example embodiment described herein there is an apparatus comprising: a first event source capable of generating a first indication of a first event which has occurred in the first event source, wherein the first indication is one of a predefined set of indications corresponding to a plurality of event types; a second event source capable of generating a second indication of a second event which has occurred in the second event source, wherein the second indication is one of the predefined set of indications corresponding to the plurality of event types; first event selection circuitry responsive to the first indication matching a selected event type of the plurality of event types to generate a first count signal; second event selection circuitry responsive to the second indication matching the selected event type of the plurality of event types to generate a second count signal; and count circuitry to increment a counter in response to the first count signal and to increment the counter in response the second count signal.

In one example embodiment described herein there is an apparatus comprising: means for generating a first indication of a first event which has occurred in a first event source, wherein the first indication is one of a predefined set of indications corresponding to a plurality of event types; means for generating a second indication of a second event which has occurred in a second event source, wherein the second indication is one of the predefined set of indications corresponding to the plurality of event types; means for generating a first count signal in response to the first indication matching a selected event type of the plurality of event types; means for generating a second count signal in response to the second indication matching the selected event type of the plurality of event types; means for incrementing a counter in response to the first count signal; and means for incrementing the counter in response the second count signal.

In one example embodiment described herein there is a method comprising: generating a first indication of a first event which has occurred in a first event source, wherein the first indication is one of a predefined set of indications corresponding to a plurality of event types; generating a second indication of a second event which has occurred in a second event source, wherein the second indication is one of the predefined set of indications corresponding to the plurality of event types; generating a first count signal in response to the first indication matching a selected event type of the plurality of event types; generating a second count signal in response to the second indication matching the selected event type of the plurality of event types; incrementing a counter in response to the first count signal; and incrementing the counter in response the second count signal.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided an apparatus comprising: a first event source capable of generating a first indication of a first event which has occurred in the first event source, wherein the first indication is one of a predefined set of indications corresponding to a plurality of event types; a second event source capable of generating a second indication of a second event which has occurred in the second event source, wherein the second indication is one of the predefined set of indications corresponding to the plurality of event types; first event selection circuitry responsive to the first indication matching a selected event type of the plurality of event types to generate a first count signal; second event selection circuitry responsive to the second indication matching the selected event type of the plurality of event types to generate a second count signal; and count circuitry to increment a counter in response to the first count signal and to increment the counter in response the second count signal.

In an apparatus with multiple event sources (i.e. at least first and second event sources) the present techniques are directed to the situation when a plurality of event types can take place in each event source and the event sources are arranged to generate indications of the various events that take place. Accordingly, each event source can generate a number of different indications (e.g. signals) corresponding to the different events which may take place. A counter may then be provided to maintain a count of a particular type of event taking place in the apparatus as a whole, i.e. in either the first or the second event source (or in any further such event sources that are present). Under these conditions the present techniques propose that a particular approach is taken to the identification of generated indications which correspond to the type of event which is to be counted. In particular, although the same event selection therefore needs to take place for each respective event source, instead of providing only a single instance of event selection circuitry to identify the relevant indications from either event source and to generate a count signal which the count circuitry can then use to increment the counter, it is proposed that dedicated event selection circuitry is provided in association with each event source in the apparatus. Whilst this could appear to be an inefficient arrangement, given that both instances of selection circuitry are essentially providing the same function, it has been found that there are circumstances under which this approach is in fact beneficial. For example, as the multiplicity of the event sources increases the connectivity which must potentially be provided between each event source and a shared event selection unit may be such that significant cost may be incurred. For example, where each event source may have various event types that it can signal, a corresponding multiplicity of wires may need to connect the event source to the event selection unit and as the number of event sources increases this "wiring cost" may become significant. However, taking the approach proposed by the present techniques, with dedicated selection circuitry for each event source, only a relatively short distance must therefore be typically covered by the multiple signals corresponding to the different event types being passed from a given event source to its event selection circuitry, and then only a relatively limited bandwidth path carrying the count signal need be provided from the respective event selection circuitry to the shared counter which maintains the count of the particular event across the multiple event sources. As a result the implementation cost of the connections between the event sources and the counter may be reduced.

There is a variety of ways in which the first event selection circuitry may be arranged with respect to the first event source, but in some embodiments the first event source comprises the first event selection circuitry. Similarly, the second event selection circuitry may be arranged in a variety of ways with a respect to the second event source, but in some embodiments the second event source comprises the second event selection circuitry. Generally in each case this will reduce the distance over which the signalling of the multiple event types must be supported.

The configuration of the first event selection circuitry to identify the selected event type and to generate the corresponding first count signal may be implemented in a variety of ways, but in some embodiments the first event source comprises first event selection configuration storage, and wherein a configuration value stored in the first event selection configuration storage determines the selected event type for the first event selection circuitry. This allows the selected event type for the first event source to be configurable.

Similarly, in some embodiments the second event source comprises second event selection configuration storage, and wherein a configuration value stored in the second event selection configuration storage determines the selected event type for the second event selection circuitry. This allows the selected event type for the second event source to be configurable.

However, the first event selection configuration storage and the second event selection configuration storage may mirror one another and the apparatus may be arranged to store the same configuration value in each, such that a unified approach to the configuration of the event selection is taken and it can thus be assured that the counter is monitoring the same event taking place in each of the multiple event sources.

Providing event selection configuration storage which stores a configuration value allows the event selection to be configurable and in some embodiments measures are taken to ensure that a count value held by the counter has a well understood meaning. In particular these measures are taken with respect to modification of the configuration values stored in the first and second event selection configuration storage. For example in some embodiments the first event source comprises first event selection configuration storage, and wherein a configuration value stored in the first event selection configuration storage determines the selected event type for the first event selection circuitry, wherein the second event source comprises second event selection configuration storage, and wherein the configuration value stored in the second event selection configuration storage determines the selected event type for the second event selection circuitry, and wherein the count circuitry is responsive to a configuration update pending signal indicating that the configuration value stored in the first event selection configuration storage and the second event selection configuration storage will be updated to prevent modification of the counter. Thus the counter is stopped before any update of the configuration value in each event selection configuration storage is started.

Further, in some embodiments the count circuitry is responsive to a configuration update complete signal from both the first event selection configuration storage and the second event selection configuration storage to re-enable modification of the counter. Thus only once the update in each event selection configuration storage is completed in the counter is the counter restarted.

As already mentioned the apparatus comprises multiple event sources and indeed the present techniques may be particularly applicable as the multiplicity of the event sources grows. Accordingly, in some embodiments the apparatus further comprises: at least one further event source capable of generating at least one further indication of at least one further event which has occurred in the at least one further event source, wherein the at least one further indication is one of a predefined set of indications corresponding to a plurality of event types; and at least one further event selection circuitry responsive to the at least one further indication matching a selected event type of the plurality of event types to generate at least one further count signal, wherein the at least one further count circuitry is responsive to the at least one further count signal to increment the counter. It should be appreciated therefore that the embodiments described herein are not limited to two event sources, but may each be extended to an arbitrary larger number of event sources.

The approach of the present techniques means that only a relatively limited bandwidth of signal need be conveyed from the respective event selection circuitry to the count circuitry, but it is further proposed that this bandwidth can be reduced further by combining the count signals from the event selection circuitry. Accordingly, in some embodiments the apparatus further comprises: summation circuitry to sum the first count signal from the first event selection circuitry and the second count signal from the second event selection circuitry to generate a summed count signal, wherein the count circuitry is responsive to the summed count signal to increase the counter equivalent to increments for the first count signal and for the second count signal.

Thus in a situation where a single wire is provided to indicate a event for a given event source the introduction of this addition technique then means that the final bandwidth (number of wires) becomes $\log_2$ (number of event sources) rather than simply (number of event sources). It should further therefore be appreciated that when the combination of the event signals in this manner takes place before a significant transmission distance (at least on the scale of the apparatus) is to be covered then the cost of connecting multiple event sources to a shared event counter may be significantly reduced.

From the above discussion it should be appreciated that these benefits in particular increase in arrangements under which the multiple connections between an event source and its event selection circuitry can be over a relatively short distance whilst the reduced multiplicity of the connection required between the event selection circuitry and the count circuitry is over a relatively greater distance. Accordingly, in some embodiments a first event transmission distance from the first event source to the first event selection circuitry is at least an order of magnitude smaller than a first count transmission distance from the first event selection circuitry to the count circuitry. Similarly, in some embodiments a second event transmission distance from the second event source to the second event selection circuitry is at least an order of magnitude smaller than a second count transmission distance from the second event selection circuitry to the count circuitry.

Viewed from another perspective in some embodiments a first event transmission bandwidth from the first event source to the first event selection circuitry is at least an order of magnitude smaller than a first count transmission bandwidth from the first event selection circuitry to the count circuitry. Similarly, in some embodiments a second event transmission bandwidth from the second event source to the second event selection circuitry is at least an order of magnitude smaller than a second count transmission bandwidth from the second event selection circuitry to the count circuitry.

In accordance with one example configuration there is provided an apparatus comprising: means for generating a first indication of a first event which has occurred in a first event source, wherein the first indication is one of a predefined set of indications corresponding to a plurality of event types; means for generating a second indication of a second event which has occurred in a second event source, wherein the second indication is one of the predefined set of indications corresponding to the plurality of event types; means for generating a first count signal in response to the first indication matching a selected event type of the plurality of event types; means for generating a second count signal in response to the second indication matching the selected event type of the plurality of event types; means for incrementing a counter in response to the first count signal; and means for incrementing the counter in response the second count signal.

In accordance with one example configuration there is provided a method comprising: generating a first indication of a first event which has occurred in a first event source, wherein the first indication is one of a predefined set of indications corresponding to a plurality of event types; generating a second indication of a second event which has occurred in a second event source, wherein the second indication is one of the predefined set of indications corresponding to the plurality of event types; generating a first count signal in response to the first indication matching a selected event type of the plurality of event types; generating a second count signal in response to the second indication matching the selected event type of the plurality of event types; incrementing a counter in response to the first count signal; and incrementing the counter in response the second count signal.

Particular embodiments will now be described with reference to the figures.

Figure 1:
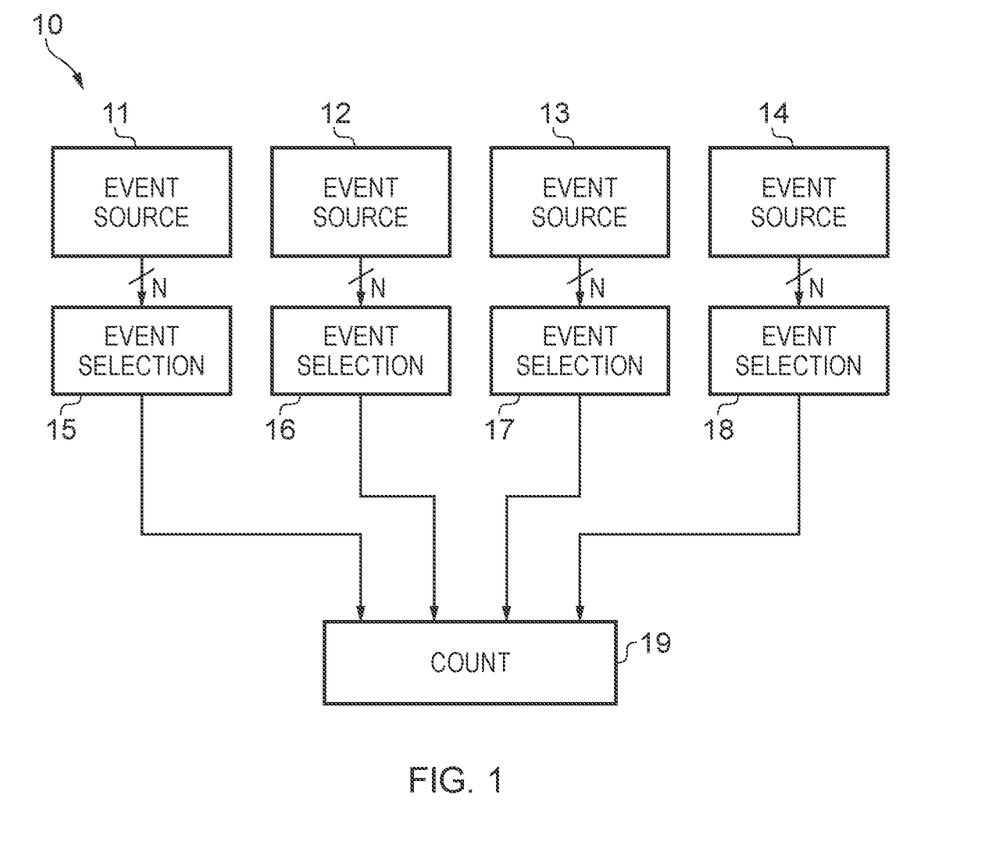
FIG. 1 schematically illustrates an apparatus in one example embodiment.

FIG. 1 schematically illustrates an apparatus 10 in one example embodiment. This comprises multiple event sources 11, 12, 13, 14. Each of these event sources may indicate a plurality of different events which can take place within them and they do so by means of the N-width connection to the respective instances of event selection circuitry 15, 16, 17, 18 respectively associated with them. The event selection circuitry 15-18 is arranged to identify a particular type of event which can occur in any of the event sources 11-14 by means of a particular combination of assertions on the respective N-width path. When such an event takes place and is identified by the respective event selection circuitry the event selection circuitry generates a corresponding count signal which is then passed to the count circuitry 19, which comprises a counter which is incremented in response to the count signal from any of the event selection circuitry 15-18. Accordingly, the value of the counter held by the count circuitry 19 indicates how often the particular event has taken place in any of the event sources 11-14.

Figure 2:
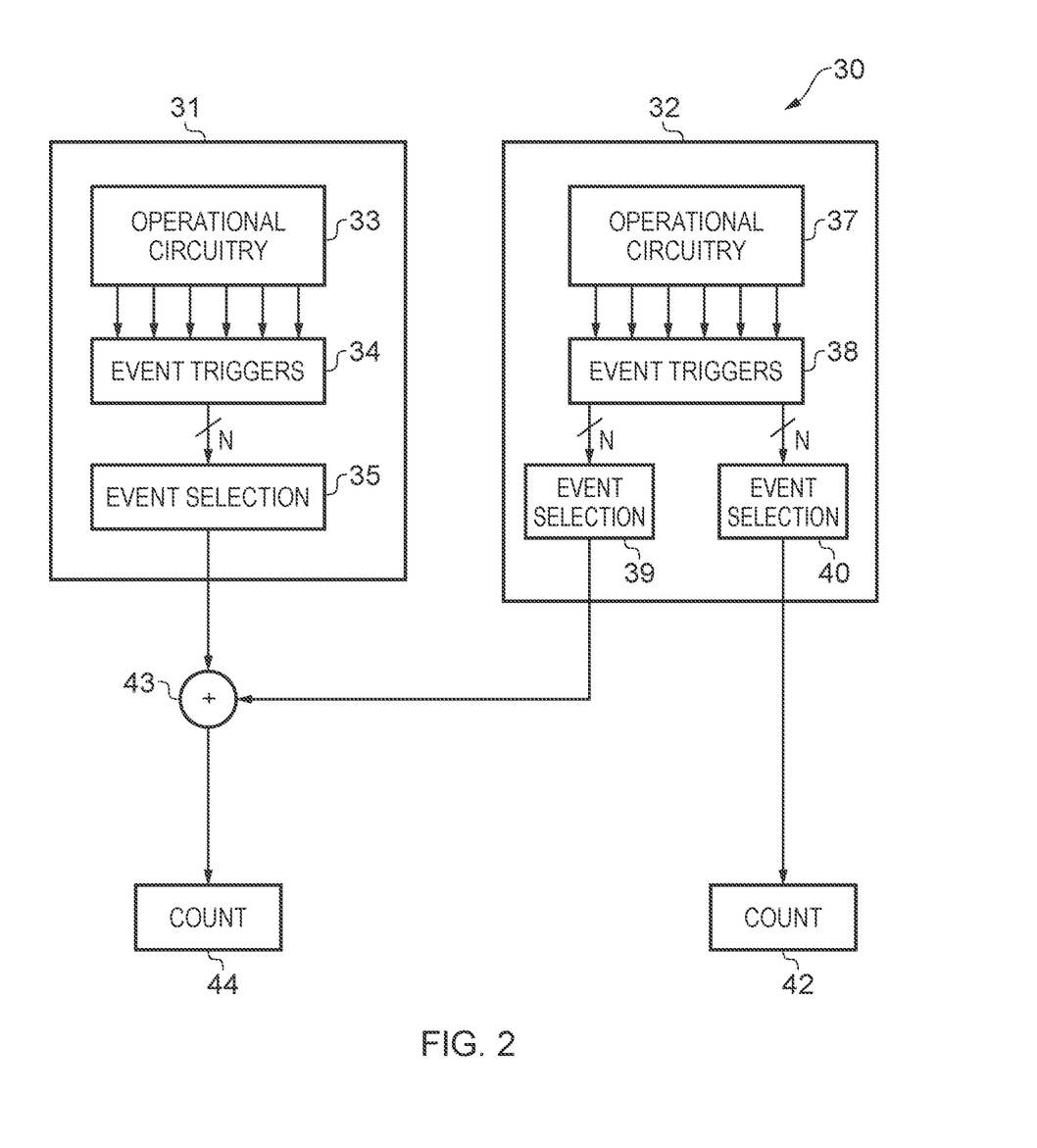
FIG. 2 schematically illustrates an apparatus in one example embodiment.

FIG. 2 schematically illustrates an apparatus 30 in one example embodiment. Two devices 31, 32 are shown, each of which can be considered to be an event source. The device 31 is shown to comprise operational circuitry 33, which performs data processing operations and associated therewith are a set of defined event triggers 34. Based on multiple signals which the event triggers 34 receive from the operational circuitry 33, the event triggers are arranged to generate indications on the illustrated N-wide path (by the assertion of selected wires amongst that path) to indicate the occurrence of predefined events within the operational circuitry 33. The event selection circuitry 35 is arranged to receive that set of indications and is configured to identify a particular type of event (indicated by a particular assertion pattern). In response to this indication the event selection circuitry 35 generates a count signal.

Similarly, device 32 comprises operational circuitry 37 which performs data processing activities and various signals are passed from the operational circuitry 37 to a set of event triggers 38, which in the case of device 32 are arranged to generate two N-wide sets of indications corresponding to the events which occur. The device 32 comprises two sets of event selection circuitry 39, 40 which are arranged to generate respective count signals when particular assertion patterns on the N-wide signals each receives occur. The count signal generated by the event selection circuitry 40 is passed directly to the count circuitry 42, which increments its counter in response. The count signal generated by the event selection circuitry 39 is received by addition circuitry 43, which also receives the count signal from the event selection circuitry 35 of device 31. The addition circuitry 43 combines these two signals into a combined count signal, which is passed to the count circuitry 44 which increments its counter in response, noting that this increment could be by two counts in the event that both device 31 and device 32 experience the same event in the same relevant time period.

Note that the multiplicity of the number of event types which are signalled from the event triggers 34, 38 to the event selection circuitry 35, 39, 40 can be large, and hence the width of the illustrated N-wide paths between them may also be large. This may for example be at least an order of magnitude larger (in path width or effective bandwidth) than the path carrying the count signal to the count circuitry.

Figure 3:
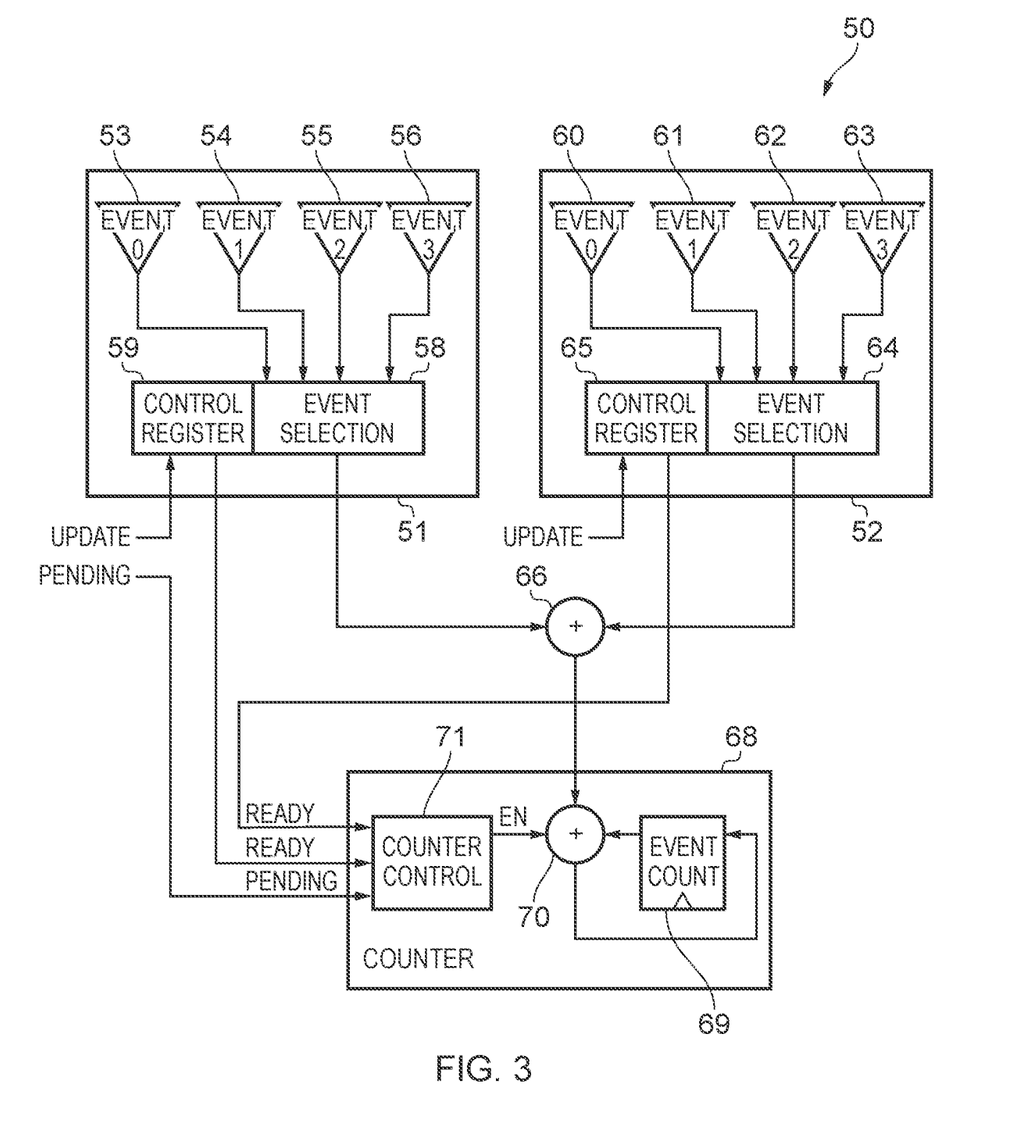
FIG. 3 schematically illustrates an apparatus in one example embodiment.

FIG. 3 schematically illustrates an apparatus 50 in one example embodiment. Two event sources 51, 52 are shown. Event source 51 is shown, schematically, as comprising four possible events (events 0-3) 53, 54, 55, 56. Indications that one of these events has occurred are received by the event selection circuitry 58, the configuration of which is controlled by the control register 59. Modification of at least one value stored in the control register 59 thus determines which of the indications received by the event selection circuitry 58, i.e. the occurrence of which event, will cause the event selection circuitry to generate its count signal. Device 52 is configured in the same manner as device 51, comprising events 60-63, event selection circuitry 64, and control register 65. The count signals generated by the event selection circuitry 58 and the event selection circuitry 64 are combined by the addition circuitry 66. This combined count signal is received by the counter circuitry 68. The counter circuitry 68 comprises a counter 69 which holds an event count. The addition circuitry 70 sums the combined count signal generated by the addition circuitry 66 with the current value held by the event counter 69 and this forms the new value to be held in the event counter 69. Note however that the addition circuitry 70 operates in dependence on an enable signal EN generated by the counter control 71 which also forms part of the counter circuitry 68. When the content of the control registers 59, 65 is to be updated a pending update signal is generated which is received by the counter control circuitry 71 and in response the enable signal EN is de-asserted. An update can then be made to the control registers 59, 65 and whilst this is on-going no modification to the value of the event counter 69 will be made, to ensure that the value held therein is well defined. Once both control register 59 and 65 indicate a ready status this is signalled to the counter control circuitry 71 and the enable signal EN can be asserted once more.

Figure 4:
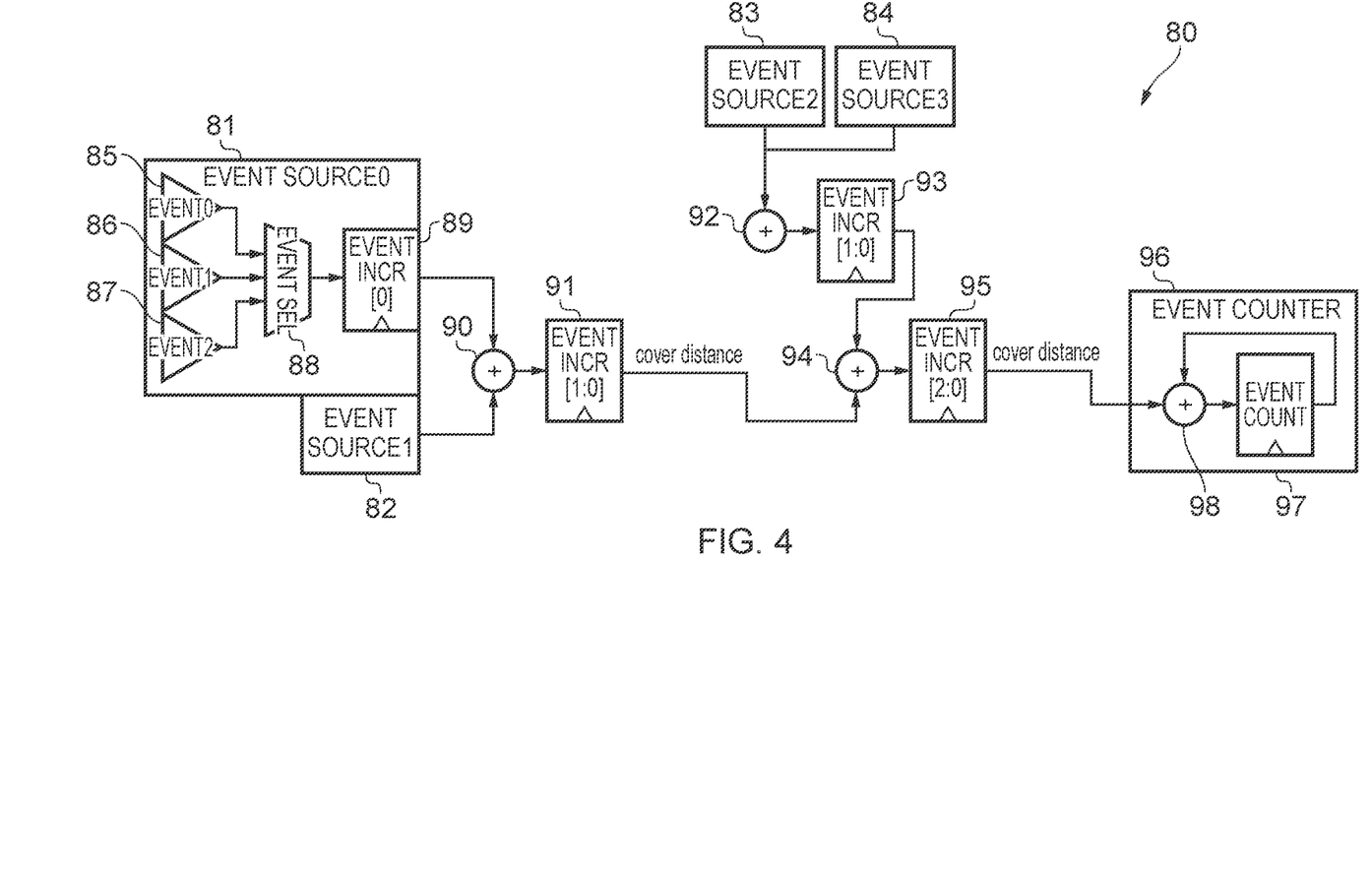
FIG. 4 schematically illustrates an apparatus in one example embodiment.

FIG. 4 schematically illustrates a further example embodiment of an apparatus 80. The apparatus comprises four event sources 81, 82, 83, 84. All four event sources are similarly configured, but detail is only shown explicitly for event source 0 (81). Within event source 0 it can be seen that three distinct events 85, 86, 87 may occur and an indication of each of these events is received by the event selection circuitry 88. The configuration of the event selection circuitry 88 is such that only one type of event will cause the event selection circuitry to generate a count signal. This count signal is temporarily held by the repeater flop 89 before being passed beyond the event source 81. Count signals in response to the same event occurring are generated in a similar manner in event sources 82, 83, and 84. Accordingly, the count signals from event source 81 and 82 are received by the addition circuitry 90 which combines these into a combined event signal which is temporarily held by the repeater flop 91. Similarly count signals from event source 83 and 84 are combined by the addition circuitry 92 and this combined signal is temporarily held by the repeater flop 93. The combined count signals from the repeater flops 91 and 93 are combined by addition circuitry 94 and the resulting further combined count signal is temporarily held by the repeater flop 95. This signal is finally received by the event counter circuitry 96. The count signal thus received is combined with the existing count held by the counter 97 by the addition circuitry 98. Note that the representation of FIG. 4 is only schematic and does not accurately represent the relative distances between the respective components. This is emphasised in two places in the figure by the labelling of two paths with the title "cover distance", indicating that this in fact represents a considerable distance between the components which these paths connect. In particular this is to be contrasted with the relatively short distances represented within each event source such as between the events 85, 86, 87 and the event selection circuitry 88. Where the event selection circuitry 88 forms part of event source 81, the ratio of these distances is likely to be at least a single order of magnitude, and may be several orders of magnitude in difference. The illustration of FIG. 4 also shows that the respective widths of the repeater flops 89, 91, 93 and 95 scales with $\log_2$ (event sources) rather than linearly with event sources.

Figure 5:
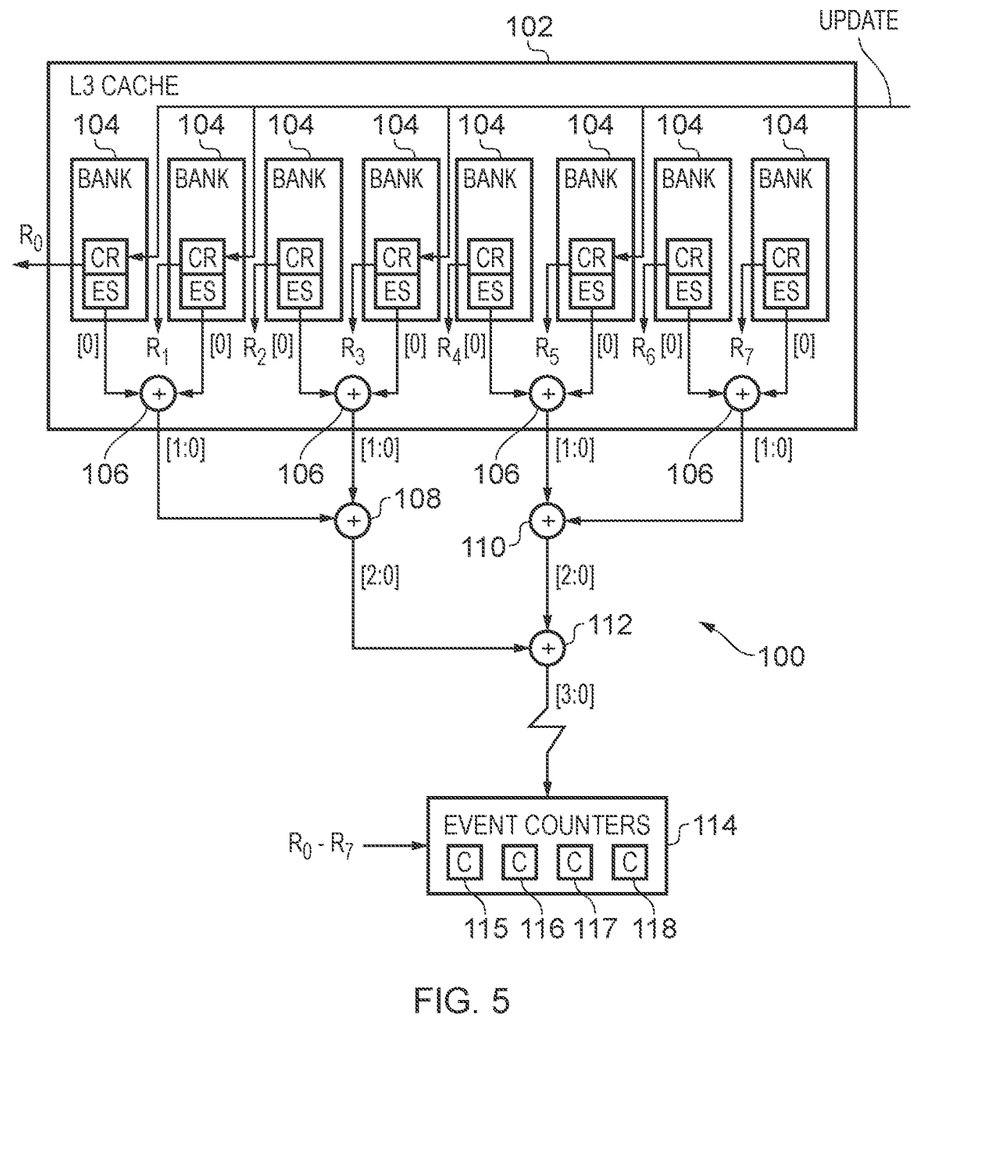
FIG. 5 schematically illustrates a level three cache and associated event counters in one example embodiment.

FIG. 5 schematically represents a further example embodiment of an apparatus 100. The apparatus 100 predominantly comprises a level 3 (L3) cache 102 which comprises eight separate banks 104. Each of these banks 104 can generate its own event signals indicative of cache-related events within that bank such as "allocation", "eviction", "hit", "miss", and so on. Each bank 104 comprises event selection circuitry ES which is configured under the control of the content of an event selection control register (CR) to identify when a particular type of cache event has occurred and on that basis to generate a count signal. The respective count signals generated by the event selection circuitry in each bank are combined in pairs by addition circuitry 106 within the L3 cache 102. These combined signals are then themselves combined by addition circuitry 108, 110 and the combined signals from the addition circuitry 108, 110 are finally combined by the addition circuitry 112. This combined count signal, which may indicate the occurrence of up to eight events (if all eight banks have simultaneously experienced the same event) is thus four bits wide. The combined count signal is received by the event counter circuitry 114 which comprises a set of event counters 115, 116, 117, 118. These respective counters are used to count occurrences of selected events within the L3 cache. Accordingly, the illustrated tree of count signals is arranged to feed into one of the event counters 115, 116, 117, 118. Hence a separate tree of count signals may be provided for each of the event counters 115, 116, 117, 118, although for simplicity and clarity of illustration only one tree is shown in FIG. 5. Thus, depending on how the event selection circuitry ES in each of the banks is currently configured, a corresponding counter is used to maintain a count of that selected event. As mentioned above with respect to FIG. 3, this configuration is arranged such that the event counters are disabled before and whilst an update to the control registers CR in the respective banks are made and only once a respective ready signal from each control register (R0-R7) is received by the event counter circuitry 114 will a respective one of the counters be re-enabled.

Figure 6:
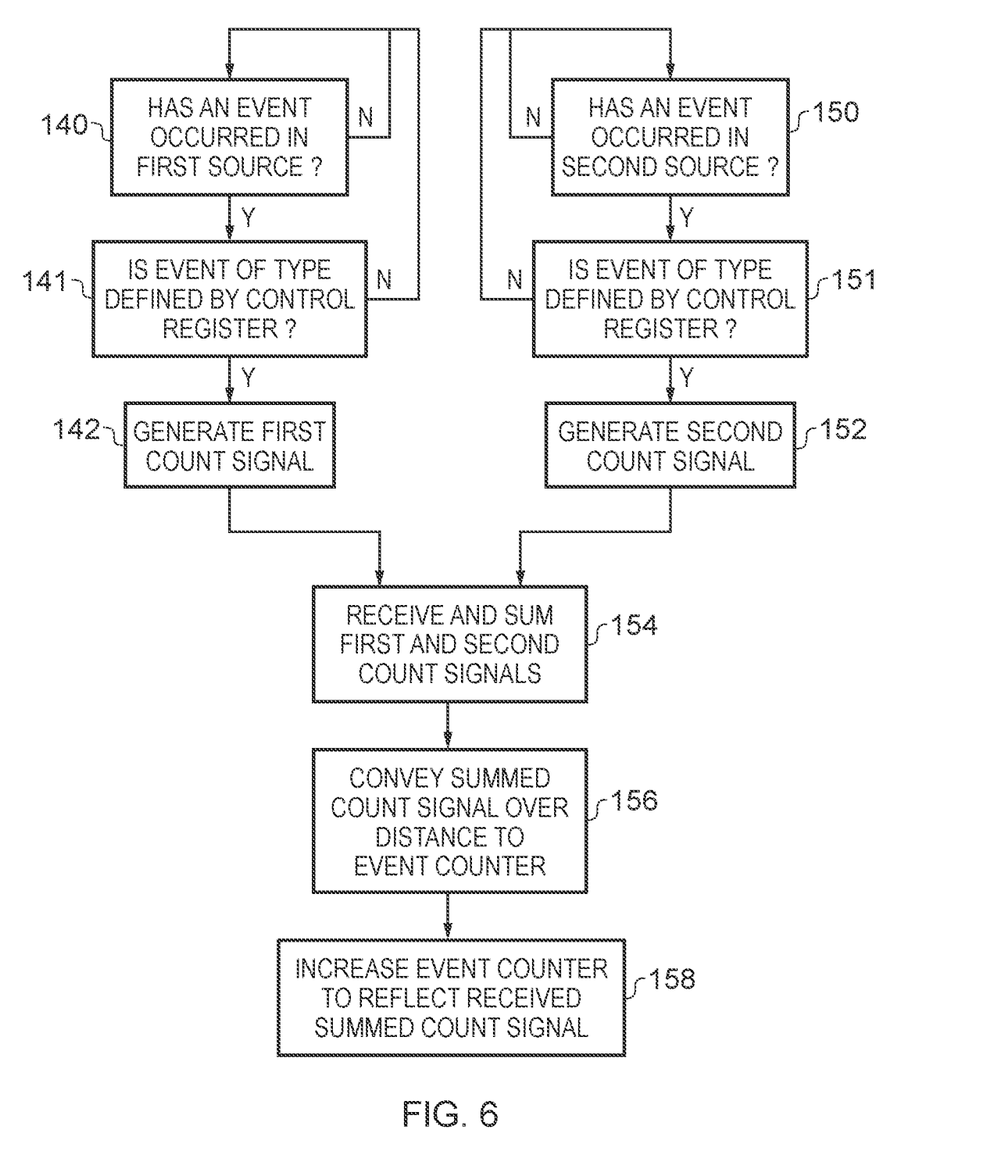
FIG. 6 shows a sequence of steps which are taken in accordance with the method of one example embodiment.

FIG. 6 is a flow diagram showing steps which occur in the method of one example embodiment. Considering first the left hand path at the beginning of the figure, at step 140 it is determined if an event has occurred within the first source. When it does then at step 141 it is determined if the event is of the type defined by the first source's control register for counting. When this is the case then the flow proceeds to step 142 where a first count signal is generated in association with this first event source. In parallel, considering the right hand path at the beginning of FIG. 6 and with these steps taking place in parallel to those in the first source, it is determined at step 150 if an event has occurred in the second source. When it has then at step 151 it is determined if this is of the type defined by the second source's control register for counting. This being the case then at step 152 a second count signal is generated. It should be appreciated that not only do the parallel steps 140, 141, 142 and 150, 151, 152 occur in parallel with one another, in fact these occur on an on-going basis, monitoring the first event source and the second event source and generating respective count signals as such events occur. At step 154 the first and second count signals generated (if respectively present) are summed, i.e. it may be the case that neither source has generated a count signal, only one of the event sources has generated a count signal, or both have generated a count signal simultaneously. The summed count signal is then conveyed at step 156 over the (possibly considerable) distance to the event counter. At step 158 the event counter is then increased to reflect the received summed count signal. In other words, this may be a simple increment when only a single count signal has been generated in association with a single event in a single source, but when multiple events have occurred in multiple sources a greater increment may be made to the stored count value.

In brief overall summary a first event source generates a first indication of a first event which has occurred in the first event source, the first indication being one of a predefined set of indications corresponding to a plurality of event types. A second event source generates a second indication of a second event which has occurred in the second event source, the second indication being one of the predefined set of indications corresponding to the plurality of event types. First event selection circuitry responds to the first indication matching a selected event type of the plurality of event types to generate a first count signal and second event selection circuitry responds to the second indication matching the selected event type of the plurality of event types to generate a second count signal. Count circuitry increments a counter in response to either the first count signal or the second count signal.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
   a first event source capable of generating a first indication of a first event which has occurred in the first event source, wherein the first indication is one of a predefined set of indications corresponding to a plurality of event types;
   a second event source capable of generating a second indication of a second event which has occurred in the second event source, wherein the second indication is one of the predefined set of indications corresponding to the plurality of event types;
   first event selection circuitry responsive to the first indication matching a selected event type of the plurality of event types to generate a first count signal;
   second event selection circuitry responsive to the second indication matching the selected event type of the plurality of event types to generate a second count signal; and
   count circuitry to increment a counter in response to the first count signal and to increment the counter in response the second count signal, wherein:
   the first event source comprises the first event selection circuitry,
   the first event source comprises first event selection configuration storage, and a configuration value stored in the first event selection configuration storage determines the selected event type for the first event selection circuitry,
   the second event source comprises second event selection configuration storage, and a configuration value stored in the second event selection configuration storage determines the selected event type for the second event selection circuitry,
   the count circuitry is responsive to a configuration update pending signal indicating that the configuration value stored in the first event selection configuration storage and the second event selection configuration storage will be updated to prevent modification of the counter.

2. The apparatus as claimed in claim 1, wherein the second event source comprises the second event selection circuitry.

3. The apparatus as claimed in claim 1, wherein the first event source comprises first event selection configuration storage, and wherein a configuration value stored in the first event selection configuration storage determines the selected event type for the first event selection circuitry.

4. The apparatus as claimed in claim 1, wherein the second event source comprises second event selection configuration storage, and wherein a configuration value stored in the second event selection configuration storage determines the selected event type for the second event selection circuitry.

5. The apparatus as claimed in claim el, wherein the count circuitry is responsive to a configuration update complete signal from both the first event selection configuration storage and the second event selection configuration storage to re-enable modification of the counter.

6. The apparatus as claimed in claim 1, further comprising:
   at least one further event source capable of generating at least one further indication of at least one further event which has occurred in the at least one further event source, wherein the at least one further indication is one of the predefined set of indications corresponding to the plurality of event types; and
   at least one further event selection circuitry responsive to the at least one further indication matching a selected event type of the plurality of event types to generate at least one further count signal,
   wherein the at least one further count circuitry is responsive to the at least one further count signal to increment the counter.

7. The apparatus as claimed in claim 1, further comprising:
   summation circuitry to sum the first count signal from the first event selection circuitry and the second count signal from the second event selection circuitry to generate a summed count signal, wherein the count circuitry is responsive to the summed count signal to increase the counter equivalent to increments for the first count signal and for the second count signal.

8. The apparatus as claimed in claim 1, wherein a first event transmission distance from the first event source to the first event selection circuitry is at least an order of magnitude smaller than a first count transmission distance from the first event selection circuitry to the count circuitry.

9. The apparatus as claimed in claim 1, wherein a second event transmission distance from the second event source to the second event selection circuitry is at least an order of magnitude smaller than a second count transmission distance from the second event selection circuitry to the count circuitry.

10. The apparatus as claimed in claim 1, wherein a first event transmission bandwidth from the first event source to the first event selection circuitry is at least an order of magnitude smaller than a first count transmission bandwidth from the first event selection circuitry to the count circuitry.

11. The apparatus as claimed in claim 1, wherein a second event transmission bandwidth from the second event source to the second event selection circuitry is at least an order of magnitude smaller than a second count transmission bandwidth from the second event selection circuitry to the count circuitry.

12. Apparatus comprising:

means for generating a first indication of a first event which has occurred in a first event source, wherein the first indication is one of a predefined set of indications corresponding to a plurality of event types;

means for generating a second indication of a second event which has occurred in a second event source, wherein the second indication is one of the predefined set of indications corresponding to the plurality of event types;

means for generating a first count signal in response to the first indication matching a selected event type of the plurality of event types;

means for generating a second count signal in response to the second indication matching the selected event type of the plurality of event types;

means for incrementing a counter in response to the first count signal;

means for incrementing the counter in response the second count signal, wherein the first event source comprises the means for generating a first count signal, wherein the first event source comprises means for storing first event selection configuration, and wherein a configuration value stored in the means for storing first event selection configuration determines the selected event type for the means for generating a first count signal, wherein the second event source comprises means for storing second event selection configuration, and wherein a configuration value stored in the means for storing second event selection configuration determines the selected event type for means for generating a second count signal; and means for preventing modification of the counter in response to a configuration update pending signal indicating that the configuration value stored in the means for storing first event selection configuration and the means for storing second event selection configuration will be updated.

13. A method comprising:

generating a first indication of a first event which has occurred in a first event source, wherein the first indication is one of a predefined set of indications corresponding to a plurality of event types;

generating a second indication of a second event which has occurred in a second event source, wherein the second indication is one of the predefined set of indications corresponding to the plurality of event types;

generating a first count signal in response to the first indication matching a selected event type of the plurality of event types;

generating a second count signal in response to the second indication matching the selected event type of the plurality of event types;

incrementing a counter in response to the first count signal;

incrementing the counter in response the second count signal, wherein the first event source comprises first event selection configuration storage, and wherein a configuration value stored in the first event selection configuration storage determines the selected event type for the first event selection circuitry, wherein the second event source comprises second event selection configuration storage, and wherein the configuration value stored in the second event selection configuration storage determines the selected event type for the second event selection circuitry; and in response to a configuration update pending signal indicating that the configuration value stored in the first event selection configuration storage and the second event selection configuration storage will be updated, preventing modification of the counter.

* * * * *